US012541219B2

(12) United States Patent
Ikuta et al.

(10) Patent No.: US 12,541,219 B2
(45) Date of Patent: Feb. 3, 2026

(54) OPTICAL COMPUTING MACHINE

(71) Applicant: NTT, Inc., Tokyo (JP)

(72) Inventors: Takuya Ikuta, Musashino (JP);
Takahiro Inagaki, Musashino (JP);
Hiroki Takesue, Musashino (JP)

(73) Assignee: NTT, Inc., Tokyo (JP)

(*) Notice: Subject to any disclaimer, the term of this patent is extended or adjusted under 35 U.S.C. 154(b) by 232 days.

(21) Appl. No.: 18/250,378

(22) PCT Filed: Oct. 30, 2020

(86) PCT No.: PCT/JP2020/040953
§ 371 (c)(1),
(2) Date: Apr. 25, 2023

(87) PCT Pub. No.: WO2022/091382
PCT Pub. Date: May 5, 2022

(65) Prior Publication Data
US 2023/0400876 A1    Dec. 14, 2023

(51) Int. Cl.
*G06E 1/00*  (2006.01)
*G02F 1/39*  (2006.01)
(Continued)

(52) U.S. Cl.
CPC ............. *G06E 1/00* (2013.01); *G02F 1/39* (2013.01); *G02F 3/00* (2013.01); *G06N 10/00* (2019.01)

(58) Field of Classification Search
CPC .... G02F 3/00; G02F 1/39; G06E 1/00; G06N 10/00
See application file for complete search history.

(56) References Cited

U.S. PATENT DOCUMENTS 9,830,555 B2 * 11/2017 Marandi ................. G06E 3/005
2022/0291568 A1    9/2022 Ikuta et al.
(Continued)

FOREIGN PATENT DOCUMENTS

JP    2015-163922 A    9/2015
JP    2015226277 A  * 12/2015
WO    2021/038765 A1    3/2021

OTHER PUBLICATIONS

Inagaki, T., et al., "Large-scale Ising spin network based on degenerate optical parametric oscillators", Nature Photon 10, pp. 415-419, https://doi.org/10.1038/nphoton.2016.68. (Year: 2016).*
(Continued)

*Primary Examiner* — Daniel Petkovsek
(74) *Attorney, Agent, or Firm* — Workman Nydegger (57) ABSTRACT

The purpose of the present invention is to provide an optical computer having high scalability and capable of reducing noise. This optical computer is characterized by including: an input layer which accepts an input signal as a computer; a reservoir layer which responds to a signal input from the input layer, and in which using a plurality of degenerate optical parametric oscillator (DOPO) pulses of a DOPO that are generated by an optical phase-sensitive amplifier (PSA) based on pump light as nodes, a connection relation between the nodes is determined by a measurement feedback method or a method equivalent to the measurement feedback method; and an output layer which outputs an output signal based on the respective responses of the plurality of DOPO pulses to the input signal from the reservoir layer.

7 Claims, 5 Drawing Sheets

(51) Int. Cl.
*G02F 3/00* (2006.01)
*G06N 10/00* (2022.01)

(56) References Cited

U.S. PATENT DOCUMENTS

2023/0153677 A1* 5/2023 Takesue .................. G06N 5/01
706/45
2023/0176607 A1* 6/2023 Takesue .................. G02F 1/39
703/2

OTHER PUBLICATIONS

English Translation of JP-2015226277-A, 7 pages. (Year: 2015).*
G. Tanaka et al., *Recent Advances in Physical Reservoir Computing: A Review*, Neural Networks, vol. 115, pp. 100-123, 2019.
R. Hamerly et al., *Experimental Investigation of Performance Differences Between Coherent Ising Machines and a Quantum Annealer*, Sci. Adv., vol. 5, No. 5, p. eaau0823, 2019.
M. Asobe, T. Umeki, and O. Tadanaga, *Phase Sensitive Amplification with Noise Figure Below the 3 Db Quantum Limit Using CW Pumped PPLN Waveguide*, Opt. Express, vol. 20, No. 12, p. 13164, 2012.
H. Jaeger and H. Haas, *Harnessing Nonlinearity: Predicting Chaotic Systems and Saving Energy in Wireless Communication*, Science, vol. 304, No. 5667, pp. 78-80, 2004.
H. Jaeger, *Adaptive Nonlinear System Identification with Echo State Networks*, Adv. Neural Inf. Process. Syst., pp. 609-616, 2003.
M. Inubushi and K. Yoshimura, *Reservoir Computing Beyond Memory-Nonlinearity Trade-off*, Sci. Rep., vol. 7, No. 1, p. 10199-1-034021-17, 2017.
K. Nakajima, et al., *Boosting Computational Power through Spatial Multiplexing in Quantum Reservoir Computing*, Phys. Rev. Appl., vol. 11, No. 3, p. 034021, 2019.
Piotr Antonik, Marc Haelterman, and Serge Massar, *Brain-Inspired Photonic Signal Processor for Generating Periodic Patterns and Emulating Chaotic Systems*, Physical Review Applied, vol. 7, pp. 054014-1-054014-16, 2017.

* cited by examiner

OPTICAL COMPUTING MACHINE

TECHNICAL FIELD

The present invention relates to an optical computer, and more particularly to a physical reservoir computer using an optical system.

BACKGROUND ART

A physical reservoir computer is known as a computer obtained by replacing an intermediate layer of a reservoir computer with a physical system. For example, a physical reservoir computer using a physical system such as a spin or a soft robot is provided (Non Patent Literature 1).

CITATION LIST

Patent Literature

Patent Literature 1: JP 2015-163922 A

Non Patent Literature

Non Patent Literature 1: G. Tanaka et al., "Recent advances in physical reservoir computing: A review," Neural Networks, vol. 115, pp. 100-123, 2019.
Non Patent Literature 2: R. Hamerly et al., "Experimental investigation of performance differences between coherent Ising machines and a quantum annealer," Sci. Adv., vol. 5, no. 5, p. eaau0823, 2019.
Non Patent Literature 3: M. Asobe, T. Umeki, and O. Tadanaga, "Phase sensitive amplification with noise figure below the 3 dB quantum limit using CW pumped PPLN waveguide," Opt. Express, vol. 20, no. 12, p. 13164, 2012.
Non Patent Literature 4: H. Jaeger and H. Haas, "Harnessing Nonlinearity: Predicting Chaotic Systems and Saving Energy in Wireless Communication," Science., vol. 304, no. 5667, pp. 78-80, 2004.
Non Patent Literature 5: H. Jaeger, "Adaptive Nonlinear System Identification with Echo State Networks," Adv. Neural Inf. Process. Syst., pp. 609-616, 2003.
Non Patent Literature 6: M. Inubushi and K. Yoshimura, "Reservoir Computing Beyond Memory-Nonlinearity Trade-off," Sci. Rep., vol. 7, no. 1, p. 10199, 2017.
Non Patent Literature 7: K. Nakajima, K. Fujii, M. Negoro, K. Mitarai, and M. Kitagawa, "Boosting Computational Power through Spatial Multiplexing in Quantum Reservoir Computing," Phys. Rev. Appl., vol. 11, no. 3, p. 034021, 2019.

SUMMARY OF INVENTION

As problems of the physical reservoir computer, generally, there is a problem of scalability related to the number of nodes of the physical system, and there is also a problem of noise generation in the physical system.

An object of the present invention is to provide an optical computer having high scalability and capable of reducing noise.

According to an aspect of the present invention, there is provided an optical computer including: an input layer which accepts an input signal as a computer; a reservoir layer which responds to a signal input from the input layer, and in which using a plurality of degenerate optical parametric oscillator (DOPO) pulses of a DOPO that are generated by an optical phase-sensitive amplifier (PSA) based on pump light as nodes, a connection relationship between the nodes is determined by a measurement feedback method or a method equivalent to the measurement feedback method; and an output layer which outputs an output signal based on the respective responses of the plurality of DOPO pulses to the input signal from the reservoir layer.

According to the aspect, an optical computer having high scalability and capable of reducing noise is provided.

DESCRIPTION OF EMBODIMENTS

Hereinafter, an embodiment of the present invention will be described in detail with reference to the drawings.

First Embodiment

A first embodiment of the present invention relates to an optical reservoir computer including a degenerate optical parametric oscillator (hereinafter, also referred to as DOPO), a reservoir layer of an optical system using a measurement feedback method, and an input layer and an output layer. Specifically, a connection relationship between DOPO pulses as nodes in the reservoir layer is realized by a measurement feedback method, and a connection matrix is set as a random matrix. In addition, a DOPO pulse is generated using an optical phase sensitive amplifier (hereinafter, also referred to as PSA).

Here, a coherent Ising machine (CIM) is known as a computer using a measurement feedback method and a DOPO. By the measurement feedback method, it is possible to maintain or improve scalability of the number of nodes while maintaining a complicated interaction between nodes (Non Patent Literature 2). Further, in PSA used in CIM, in principle, amplification can be performed with a noise figure of 0 dB, that is, without a degradation in signal-to-noise ratio, and noise can be reduced in an optical computer to be provided (Non Patent Literature 3).

In the embodiment of the present invention, components of a CIM described above are used in a physical reservoir computer. On the other hand, for an interaction (connection relationship) between DOPOs, in a case of a CIM, in order to solve a problem such as system optimization, an interaction that is unique to the problem is given. However, an optical reservoir computer according to the present invention is characterized in that a randomly-determined interaction is given and that an input layer for inputting a signal from the outside of an optical system except for feedback and an output layer for outputting a signal are included.

Figure 1:
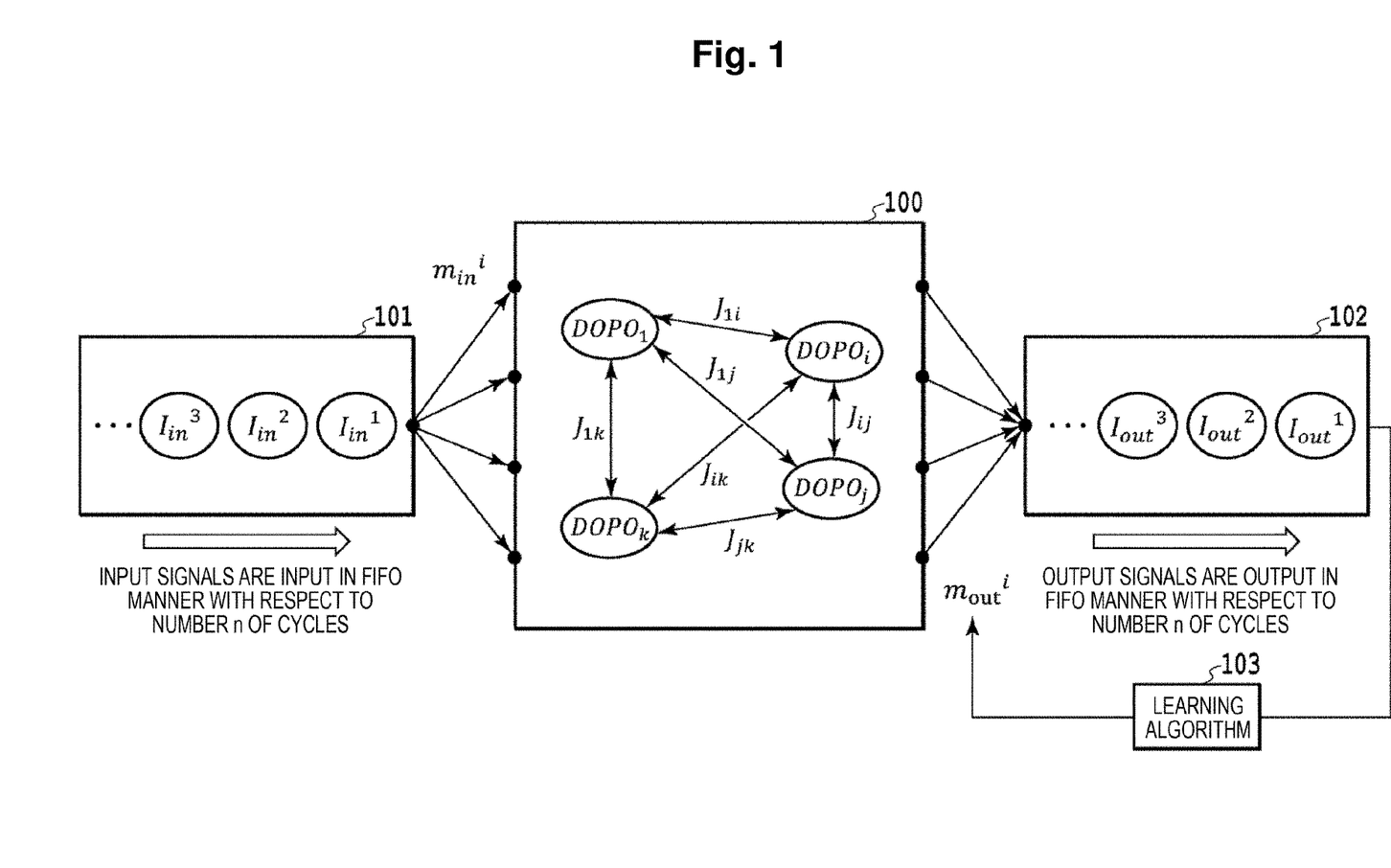
FIG. 1 is a diagram schematically illustrating a configuration of an optical reservoir computer according to an embodiment of the present invention.

FIG. 1 is a diagram schematically illustrating a configuration of an optical reservoir computer according to an embodiment of the present invention. As illustrated in FIG. 1, the optical reservoir computer according to the present embodiment includes a reservoir layer 100, an input layer 101, and an output layer (also referred to as a lead-out layer) 102. In the reservoir layer 100, $DOPO_1, \ldots, DOPO_i, DOPO_j, \ldots,$ and $DOPO_k$ as nodes are configured by DOPO pulses (hereinafter, representatively represented by $DOPO_i$). Interactions (connection relationships) $J_{1j}, \ldots, J_{ij}, \ldots,$ and $J_{ik}$ (hereinafter, representatively represented by $J_{ij}$) are set between the nodes. In addition, input signals $I_{in}^1, I_{in}^2,$ and $I_{in}^3$ (hereinafter, representatively represented by $I_{in}^n$) of the nodes of the input layer 101 are respectively input to each node $DOPO_i$ of the reservoir layer 100 in a form of first in first out (FIFO) for n to be described later by using a calculation to be described later (connection edges are not illustrated). On the other hand, output signals $I_{out}^1, I_{out}^2,$ and $I_{out}^3$ (hereinafter, representatively represented by $I_{out}^n$) of the nodes of the output layer 102 are output to in the FIFO manner for n, as a result of calculation to be described later on the signals of each node $DOPO_i$ of the reservoir layer.

For the input signal $I_{in}^n$ from the input layer 101, a weight is applied to the input signal $I_{in}^n$ for the corresponding node $DOPO_i$ by using a mask mini determined for each node $DOPO_i$ of the reservoir layer 100. In addition, the output signal $I_{out}^n$ from the output layer 102 is obtained by calculating a sum obtained by applying a weight to a cos component $c_i^n$ of an electric field amplitude of the corresponding node $DOPO_i$ by using a mask $m_{out}^i$ determined for each node $DOPO_i$ of the reservoir layer 100. The electric field amplitude will be described later. Further, learning is performed on the output mask $m_{out}^i$ by a learning algorithm 103. For the learning algorithm, for example, a learning algorithm such as linear regression (Non Patent Literature 4) or adaptive control (Non Patent Literature 5) is selected such that the output of the reservoir computer is a desirable output for a task.

The optical reservoir computer according to the present embodiment described above handles time-series inputs. As will be described later with reference to FIG. 2 and the like, in generation of DOPO pulses, M DOPO pulses are generated by using pulse light as pump light and setting a time interval of the light to 1/M of one round time for which the pulse light cycles around a resonator. Among the M pulses, k pulses are used as pulses for calculation. In a certain cycle n, an input signal $I_{in}^n$ is multiplied with a wight and input to each of all the k pulses. All the k pulses are also measured in a certain cycle n, and an n-th cycle output $I_{out}^n$ is obtained by a sum which is obtained by applying a weight to each measurement result of all the k pulses. In the present embodiment, these input and output signals are, for example, time-series signals such as audio signals, or signals (time-series signals) obtained by mapping spatially-parallel signals such as a handwritten text image in a time direction. These signals are examples, and various types of input/output signals that are available in a general reservoir computer can be used.

Figure 2:
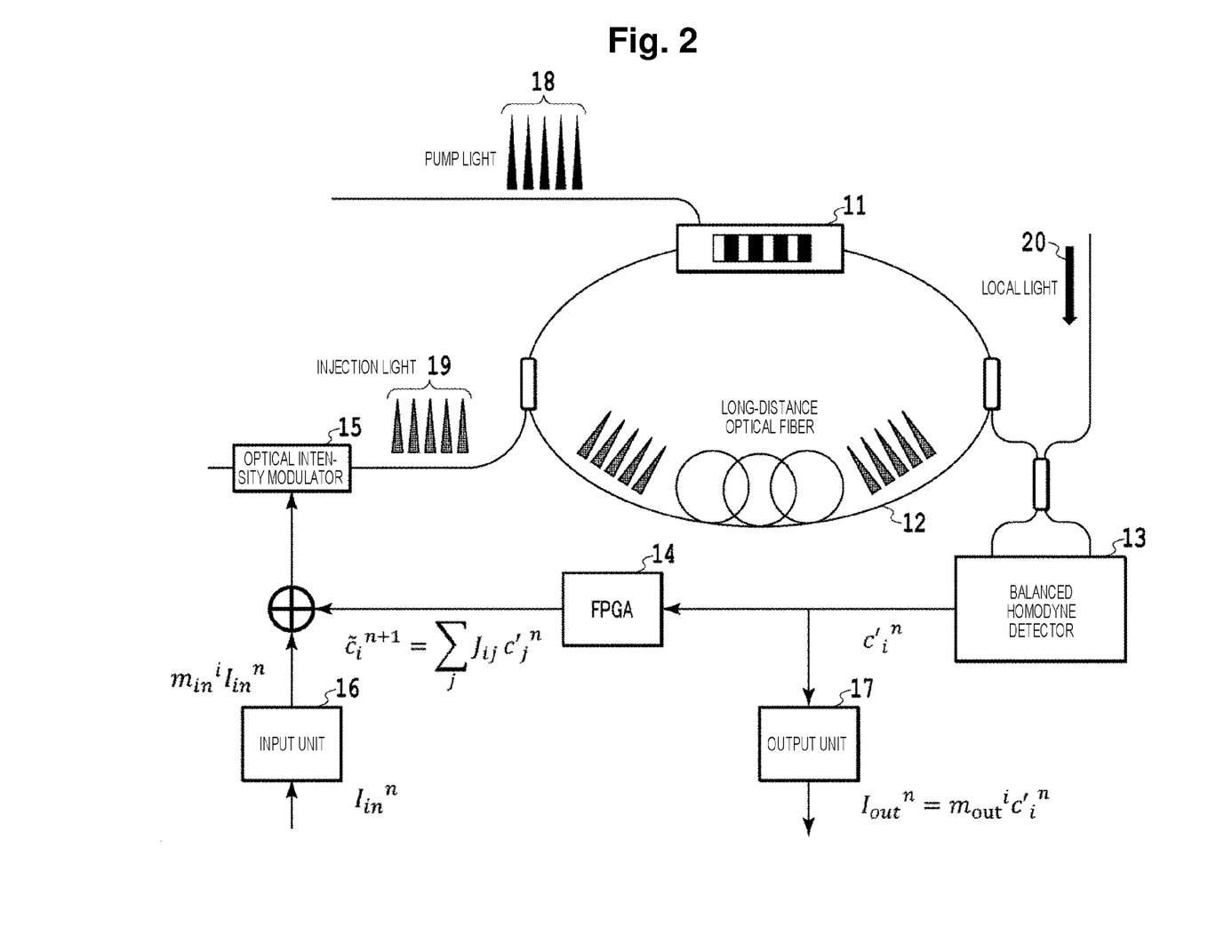
FIG. 2 is a schematic diagram illustrating a configuration of the optical reservoir computer according to the first embodiment of the present invention.

FIG. 2 is a schematic diagram illustrating a configuration of a DOPO according to a first embodiment of the present invention. As illustrated in FIG. 2, the DOPO according to the present embodiment uses an optical fiber ring resonator including a periodically poled lithium niobate (hereinafter, also referred to as PPLN) waveguide 11 and a long-distance optical fiber 12 having both ends connected to each end of the PPLN waveguide 11. The PPLN waveguide 11 is used as a PSA. Thereby, it is possible to generate time-division-multiplexed DOPO pulses in the resonator based on pulsed pump light 18 which is input to the PPLN waveguide 11. There are a plurality of DOPO pulses in the resonator, and the pulses cycle around the resonator. Some DOPO pulses among the DOPO pulses are used as pulses for calculation that are used as nodes of the reservoir layer illustrated in FIG. 1, and the other pulses are used as dummy pulses that are used for stabilizing the optical system. The number of pulses that cycle in the resonator and a ratio between the pulses for calculation and the dummy pulses can be changed depending on a length of the optical fiber, a repetition frequency of the pump pulse, and the like. In the specification and the drawings, a label for individually identifying a pulse for calculation is i, and a label for identifying each cycle is n.

Note that a method of using the dummy pulse is not related to calculation in the present embodiment and the dummy pulse can be used in other ways and for other purposes.

A balanced homodyne detector 13 measures an amplitude of the DOPO pulse ($DOPO_i$) that cycles in the resonator by using local light 20 which is input via an optical coupler. The local light 20 is light for interference in homodyne detection. The amplitude signal which is output from the balanced homodyne detector 13 is input to a field programmable gate array (FPGA) 14, is weighted by an output mask in an output unit 17, and then is output as an output $I_{out}^n$ of the output layer 102.

The FPGA 14 performs a calculation to be described later on the amplitude of the DOPO pulse from the balanced homodyne detector 13 by using the interaction (connection relationship) $J_{ij}$ between the DOPOs as the nodes described in FIG. 1, and generates a feedback signal.

An optical intensity modulator 15 injects injection light 19 into the DOPO pulse in the resonator via an optical coupler, the injection light being light having, as an amplitude, a sum of an input $m_{in}^i I_{in}^n$ to the reservoir layer 100 that is weighted by the input unit 16 and a feedback signal $c'i^{n+1}$ to be described later from the FPGA 14.

Hereinafter, calculation using the DOPO pulses ($DOPO_i$) as the nodes in the reservoir layer 100 will be described with reference to FIG. 2. For convenience of description, first, time evolution of the DOPO pulse in a case where there is no input and output to and from the optical reservoir computer according to the present embodiment will be described.

Step 1: It is assumed that, at an input end of the PPLN waveguide 11 in the resonator, a cos component and a sin component of an electric field amplitude of an i-th DOPO pulse at an n-th cycle are $c_i^n$ and $s_i^n$ respectively. Further, it is assumed that an amplitude of pump light with respect to the i-th DOPO pulse is $p_i$. At this time, time evolution of the DOPO pulse in the PPLN waveguide 11 is given by the following Equations.

$$\frac{dc_i^n}{dt} = \left(-1 + p_i - (c_i^n)^2 - (s_i^n)^2\right)c_i^n \quad \text{(Equation 1)}$$

$$\frac{ds_i^n}{dt} = \left(-1 - p_i - (c_i^n)^2 - (s_i^n)^2\right)s_i^n \quad \text{(Equation 2)}$$

Here, noise terms are omitted in the above Equations. It is assumed that a cos component and a sin component of an electric field amplitude after time evolution for a propagation time of the PPLN waveguide 11 according to Equation 1 and Equation 2, that is, a cos component and a sin component of an electric field amplitude of a DOPO pulse which is output from the PPLN waveguide 11 are $c'^n_i$ and $s'^n_i$ respectively.

Step 2: A part of the DOPO pulse which is output from the PPLN waveguide 11 is extracted using an optical coupler, and a voltage signal which is proportional to $c'^n_i$ is acquired by performing homodyne detection by using local light, a 50:50 optical coupler, and a balanced homodyne detector 13.

Step 3: The voltage value measured by the balanced homodyne detector 13 is transmitted to the FPGA 14. The FPGA 14 calculates feedback for the i-th DOPO pulse at an (n+1)-th cycle by the following Equation using a connection matrix (interaction) $J_{ij}$ determined by a preset random value:

$$\tilde{c}^{n+1}_i = \sum_i J_{ij} c'^n_j$$

Here, in the CIM described above, $J_{ij}$ represents a problem to be solved. On the other hand, in the present embodiment, $J_{ij}$ represents a matrix which is randomly set.

Step 4: The optical intensity modulator 15 performs amplitude modulation of the light pulse by using $c'^{n+1}_i$ calculated by the FPGA 14, and injects, as injection light, the modulated light pulse into the resonator via the optical coupler. Thereby, the electric field amplitude of the DOPO pulse which is input to the PPLN waveguide 11 at the (n+1)-th cycle is given by the following Equation.

$$c^{n+1}_i = \sqrt{\eta} c'^n_i + r\tilde{c}^{n+2}_i = \sqrt{\eta} c'^n_i + r\Sigma_j J_{ij} c'^n_j \quad \text{(Equation 3)}$$

$$s^{n+1}_i = \sqrt{\eta} s'^n_i \quad \text{(Equation 4)}$$

Here, η is a parameter representing a transmissivity of the optical system including the optical coupler and the like from the output of the PPLN waveguide 11 to the input of the PPLN waveguide 11, and r is a parameter representing an effective injection ratio from measurement to injection into the resonator.

Step 5: step 1 to step 4 are repeated.

By step 1 to step 4, the time evolution of the DOPO pulse at each cycle is described, the DOPO pulse being the node of the reservoir layer 100 of the reservoir computer illustrated in FIG. 1. An input/output relationship before and after the time evolution of (Equation 1) and (Equation 2) corresponds to a nonlinear function in reservoir calculation, and a change according to (Equation 3) and (Equation 4) corresponds to an interaction between the nodes.

Figure 3:
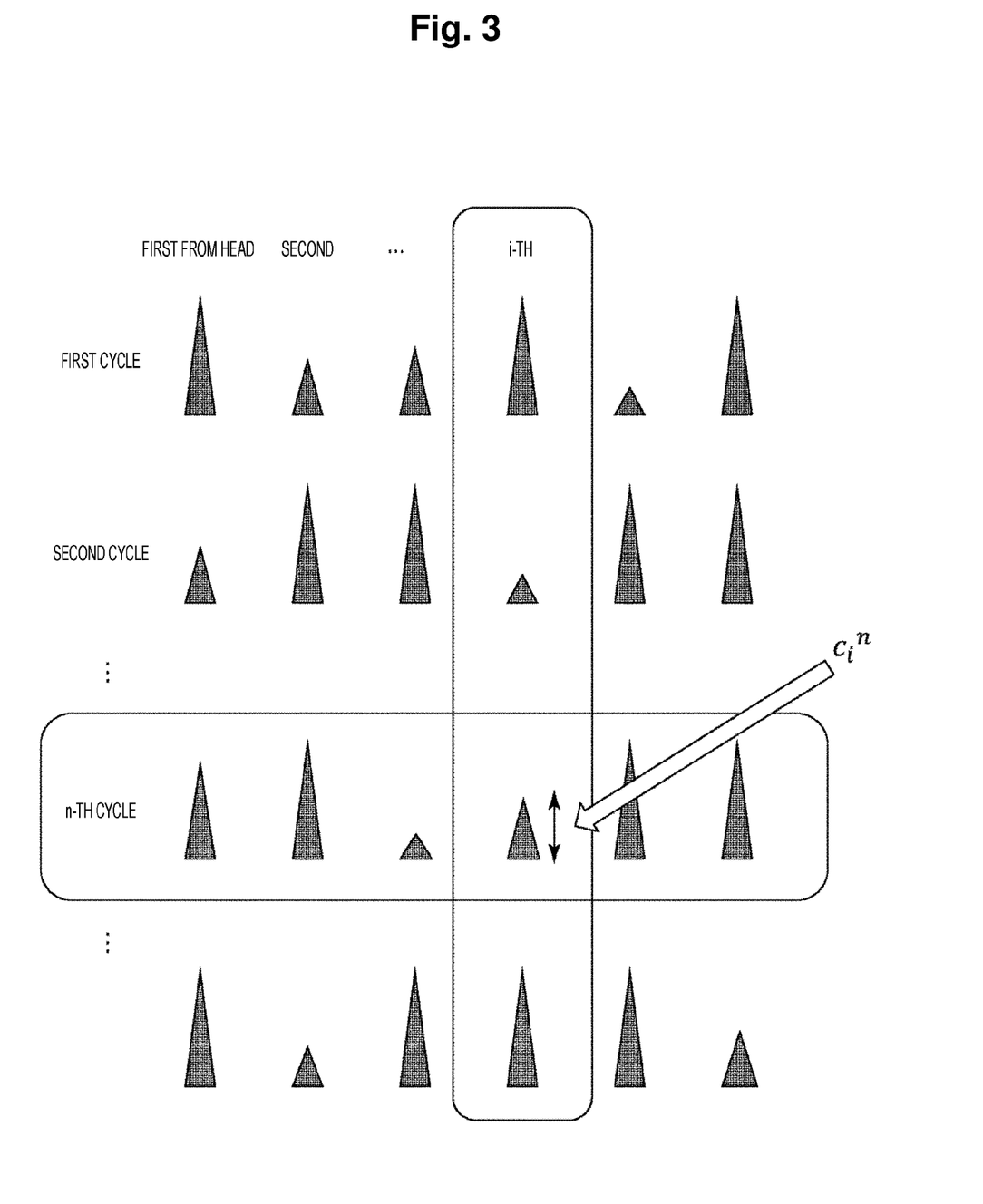
FIG. 3 is a diagram for explaining pulse identification labels of DOPO pulses according to the first embodiment and a relationship between the number of cycles and a cos component $c_i^n$ of an amplitude of the DOPO pulse in a resonator.

FIG. 3 is a diagram illustrating an identification label i of the DOPO pulse described above and an amplitude $c^n_i$ of a cos component of an electric field amplitude of the DOPO pulse at an n-th cycle in the resonator. The following description is also appropriate for an amplitude $s^n_i$ of a sin component of an electric field amplitude of the DOPO pulse at the n-th cycle, and this can be apparent from the description.

As illustrated in FIG. 3, the amplitude $c^n_i$ represents an amplitude of the i-th DOPO pulse ($DOPO_i$) at the n-th cycle in the resonator. In addition, as described in FIG. 1, the pulse $DOPO_i$ is each node of the reservoir layer 100. Further, the input to the input layer 101 is represented as an input $I^n_{in}$ at the n-th cycle, and the output from the output layer 102 is represented as an output $I^n_{out}$ at the n-th cycle. As described above, in the resonator, for a plurality of (k) pulses $DOPO_i$ at a first cycle, the time evolution of the amplitudes of the pulses is governed by (Equations 1) to (Equation 4). Based on a result of the time evolution at the first cycle, for pulses $DOPO_i$ at the second cycle as a next cycle, the time evolution of the amplitudes of the pulses is governed by (Equations 1) to (Equation 4). In this manner, sequentially, for a plurality of (k) pulses $DOPO_i$ at the n-th cycle, the amplitudes of the pulses evolves in time.

In addition, in the calculation according to the present embodiment, as an example, in a case where recognition of an audio signal, a handwritten text image, or the like is set as a task, the audio signal or the image is divided into N time-series signals and calculation is performed. That is, the cycle n is finite, and can be expressed as 1≤n≤N. On the other hand, in a case where calculation is a task of time-series prediction, for example, a step of inputting pieces of data from a timing 1 to a timing n−1, that is, signals from a cycle 1 to a cycle n−1 can be continually and infinitely performed in principle. From this point, n may be infinite. As described above, the number of n is determined depending on a task of calculation.

Next, a calculation procedure by the optical reservoir computer according to the present embodiment that has the above-described configuration will be described with reference to FIG. 2.

A time-series signal $I^n_{in}$ according to a task of the computer is input to the input unit 16.

The input unit 16 outputs $m^i_{in} I^n_{in}$ corresponding to the input signal $I^n_{in}$ by performing processing on the i-th DOPO pulse at the n-th cycle by using the input mask $m^i_{in}$. Here, the input mask mini is a predetermined weight for an input signal.

The input signal is added to a feedback signal from the FPGA 14, and is input to the optical intensity modulator 15. Thereby, a cos component of an optical electric field amplitude of the injection light can be represented as a value proportional to $$\tilde{c}^n_i = m^i_{in} I^n_{in} + \sum_j J_{ij} c'^{n-1}_j$$

instead of $$\tilde{c}^n_i = \Sigma_j J_{ij} c'^{n-1}_j.$$

Next, the injection light which is modulated by the optical intensity modulator 15 is injected into the DOPO pulse in the resonator via the optical coupler. Thereby, the electric field amplitude of the DOPO pulse which is input to the PPLN waveguide 11 is given by the following Equation.

$$c^n_i = \sqrt{\eta} c'^{n-1}_i + r(m^i_{in} I^n_{in} + \Sigma_j J_{ij} c'^{n-1}_j) \quad \text{(Equation 3')}$$

$$s^n_i = \sqrt{\eta} s'^{n-1}_i \quad \text{(Equation 4')}$$

The pulses represented by (Equation 3') and (Equation 4') change according to the basic time evolution (Equation 1) and (Equation 2), and become a voltage signal proportional to $c'^n_i$ as a result of homodyne detection. Further, the output unit 17 applies a weight $m^i_{out}$ to the voltage signal. Thereby, an output of the optical reservoir computer at the n-th cycle is obtained by the following expression:

$$I^n_{out} = \sum_i m^i_{out} c'^n_i$$

In addition, as described in FIG. 1, the weight $m^i_{out}$ of the output unit 17 is learned by the learning algorithm 103 by linear regression, adaptive control, or the like. Thereby, it is possible to make the output $I_{out}^n$ of the optical reservoir computer according to the present embodiment into an output suitable for the calculation task.

Further, after learning, in a case where $m_{out}^i$ is fixed and the input $I_{in}^n$ is simply given, the optical reservoir computer can be used as a computer that outputs the output $I_{out}^n$.

As described above, according to the first embodiment of the present invention, high scalability for the number of the nodes can be obtained by using time division multiplexing and a measurement feedback method for the configuration of the reservoir layer. In addition, by using PSA with low noise for generation of the DOPO pulse, physical noise can be reduced. Thereby, it is possible to prevent a decrease in calculation performance.

Further, in the embodiment of the present invention, a DOPO as a physical system is used. Thereby, it is possible to utilize a nonlinear optical effect with a fast time response, and to generate a large number of independent nodes as nodes when feedback is not provided. Specifically, in a case where a DOPO is used as an optical reservoir, a response of the pump light is very fast and a response time is practically negligible. Thus, a mutual influence of the amplitudes $p_i$ and $p_{i+1}$ of the consecutive light pulses of the pump light can be eliminated (independence of states of the nodes or the DOPO pulses). In addition, by combining the independence of the nodes and the measurement feedback method, it is possible to introduce, for the nodes, a connection $J_{ij}$ of any topology that are not restricted by a degree of physical freedom. Thereby, for example, it is possible to combine different types of reservoirs described in Non Patent Literature 6 and Non Patent Literature 7.

Further, the pulse amplitude $p_i$ can be arbitrarily set. Thus, a degree of freedom in design of the reservoir layer is increased, and high calculation performance can be derived. Note that, in order to simplify the configuration, a constant pulse amplitude $p_i$ of the pump light may be uniformly set for all the DOPOs.

Second Embodiment

A second embodiment of the present invention relates to an optical reservoir computer in which an optical system using a DOPO and interactions by optical coupling is used for a reservoir layer. Specifically, a configuration of the measurement feedback method using the FPGA in the first embodiment is realized by using an optical delay interferometer.

Figure 4:
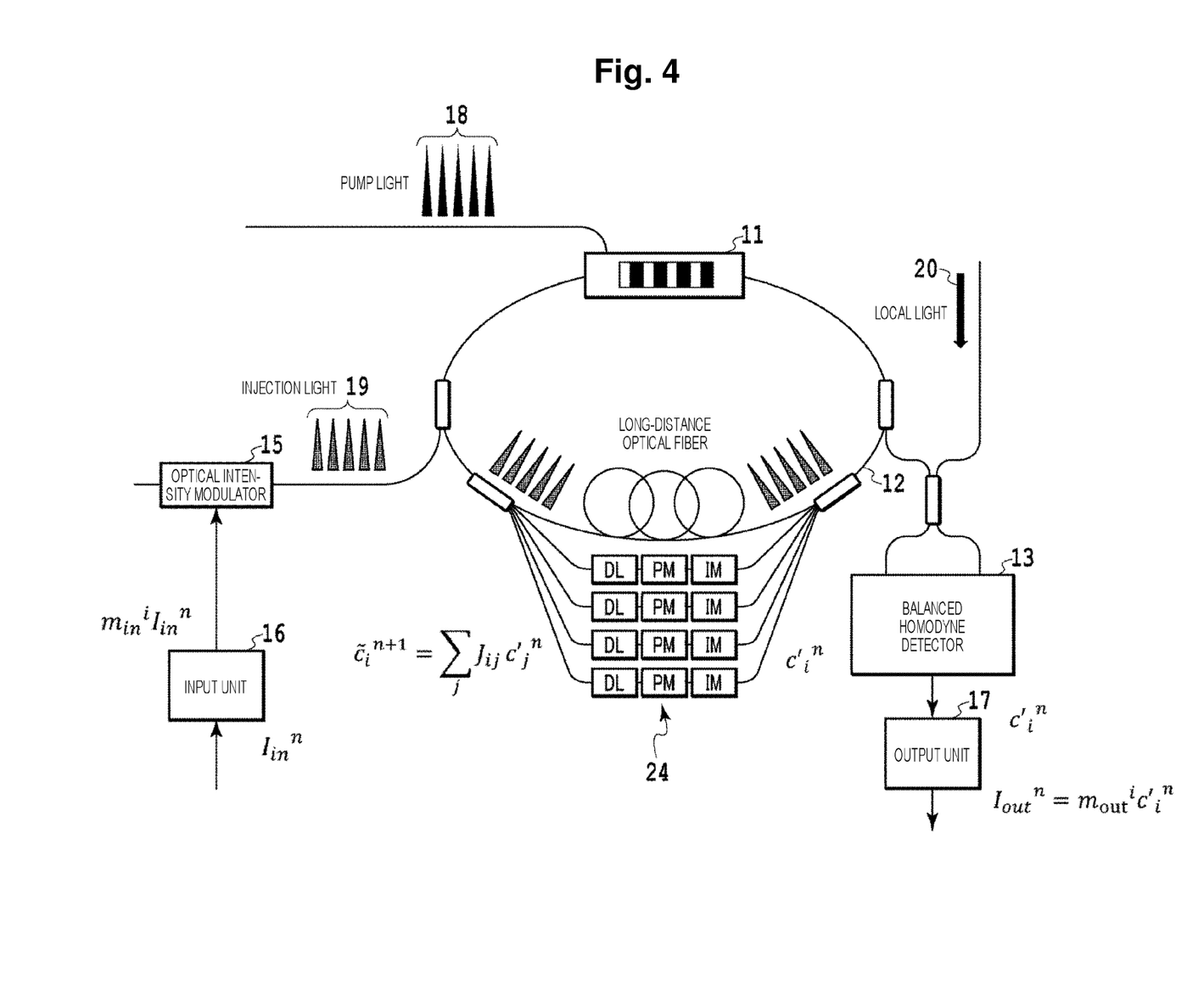
FIG. 4 is a schematic diagram illustrating a configuration of the optical reservoir computer according to the second embodiment of the present invention.

FIG. 4 is a schematic diagram illustrating a configuration of a DOPO according to a second embodiment of the present invention. The configuration is different from the configuration according to the first embodiment illustrated in FIG. 2 in that an optical delay interferometer 24 is used instead of the FPGA 14 of FIG. 2. The optical delay interferometer 24 is obtained by connecting an optical delay line DL, an optical phase modulator PM, and an optical intensity modulator IM.

In FIG. 4, the amplitude $c'_i{}^n$ of the DOPO pulse is input to the optical delay interferometer 24, and the amplitude signal $c'_i{}^{n+1}$ is output, the amplitude $c'_i{}^n$ being a result of time evolution according to (Equation 1) and being output from the resonator via the optical coupler. That is, in the present embodiment, a plurality of optical delay lines are used, and thus two certain light pulses are combined. (Patent Literature).

In the present embodiment, the optical delay interferometer 24 has a function corresponding to Equation (3) and Equation (4) for the time evolution described above, and thus time evolution equivalent to the measurement feedback method according to the first embodiment can be implemented.

According to the second embodiment of the present invention described above, in addition to the same effects as those of the first embodiment described above, all optical reservoir layers can be provided by using light. Therefore, by utilizing a broadband property of light and shortening the time interval of the light pulses, it is possible to increase a speed of calculation and to make a device compact in size. In addition, it is possible to realize a reservoir computer utilizing advantages such as extremely low noise of PSA and generation of independent pulses by high-speed response of PSA.

In addition, the connection matrix $J_{ij}$ may be a random matrix in the reservoir calculation. Thus, some or all of the intensity modulator and the phase modulator on the optical delay line may be omitted.

OTHER EMBODIMENTS

In the above-described embodiments, an example in which the PPLN waveguide is used as an optical element has been described. On the other hand, other optical elements having second-order nonlinearity may be used.

Further, the PSA can also be realized by using a nonlinear optical element as a third-order optical element and using a pulse train for two wavelengths as pump light (Patent Literature 1). Thereby, similar calculation can be performed while maintaining a function for low noise. Here, in that case, it goes without saying that the time evolution according to (Equation 1) and (Equation 2) is replaced with time evolution exhibiting a third-order nonlinear optical effect.

In the above-described embodiments, for example, a case where an optical fiber ring resonator including a PPLN waveguide and a long-distance optical fiber is used has been described for convenience. On the other hand, it goes without saying that an optical component which does not affect the function of the optical computer of the present application, such as an optical filter for removing noise light having a wavelength which is not necessary for the optical computer, can be inserted into the inside or the outside of the resonator.

In the above-described embodiments, an example in which the input signal is a scalar time-series signal represented by $I_{in}^n$ has been described. It goes without saying that the present invention is not limited to these embodiments. For example, in a case where an array value such as image data or the like is input, the input signal may be given as a vector or a matrix, and more generally a time-series signal of a high-order tensor. In this case, the input to the reservoir layer 100 can be extended to $\Sigma_{a\,b}\ldots m_{in}^{ia\,b}\ldots (I_{in}^n)_{ab}$. The same applies to the output signal.

Figure 5:
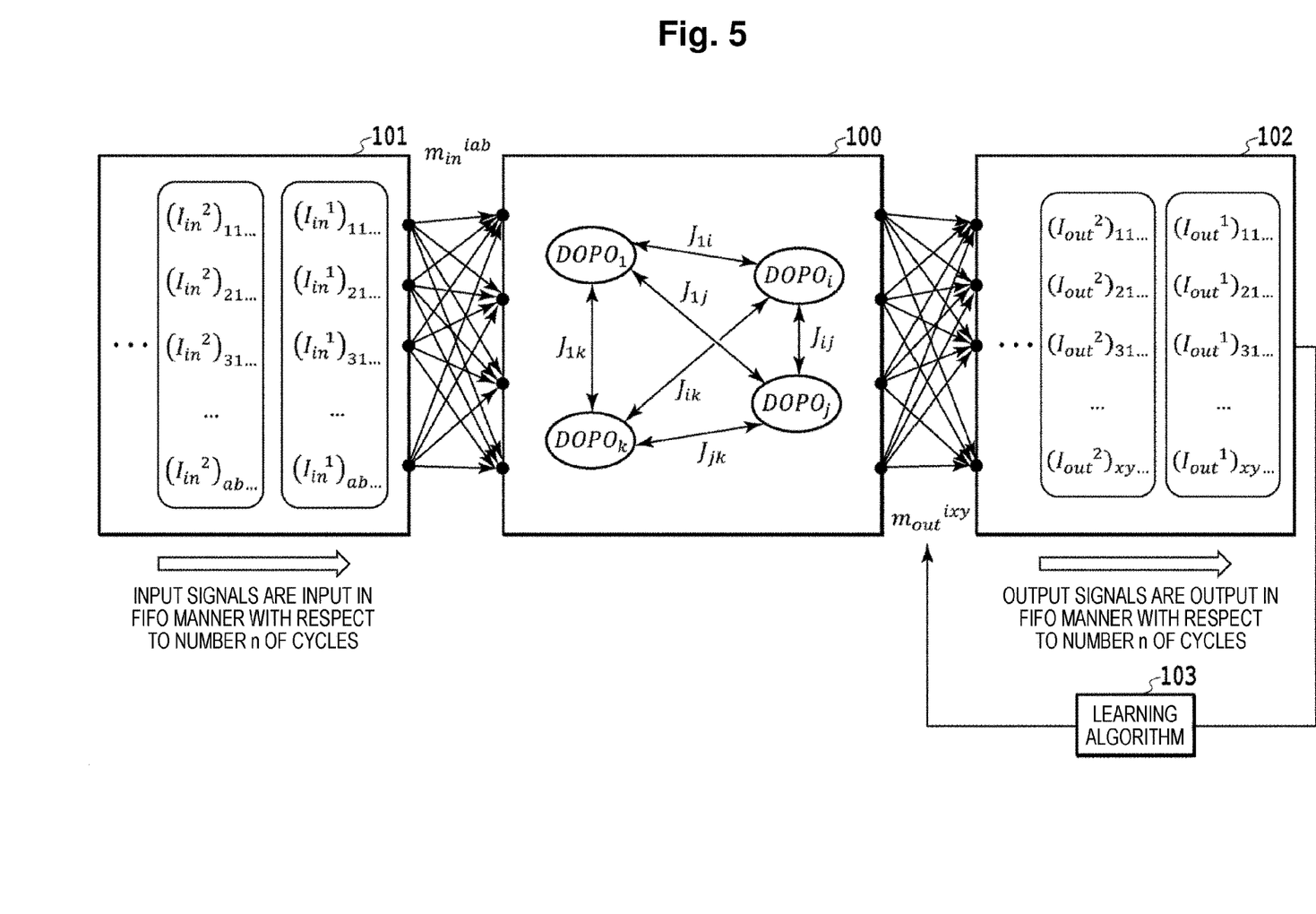
FIG. 5 is a diagram schematically illustrating another configuration example of the optical reservoir computer according to the embodiment of the present invention.

FIG. 5 is a diagram illustrating an optical reservoir computer according to this embodiment, and is a diagram similar to FIG. 1. For the time-series signal of the high-order tensor, input and output are also performed in the FIFO manner.

Note that the FPGA used in the above-described embodiment can be replaced with another calculator using a technique such as ASIC.

The invention claimed is:
1. An optical computer comprising:
an input layer which accepts an input signal to the optical computer;

a reservoir layer which responds to the input signal input from the input layer, in the reservoir layer, a plurality of degenerate optical parametric oscillator (DOPO) pulses of a DOPO are generated by an optical phase-sensitive amplifier (PSA) based on pump light and are made nodes, and a connection relation between the nodes is determined by a measurement feedback method or a coupling method using optical delay lines, wherein the connection relation between the nodes is determined as a random value; and an output layer which outputs an output signal based on the respective responses of the plurality of DOPO pulses to the input signal from the reservoir layer.

2. The optical computer according to claim 1, wherein the output signal is a signal obtained by applying a weight to each of the plurality of DOPO pulses.

3. The optical computer according to claim 2, further comprising:

a learning means for changing the weight by performing learning based on the output signal.

4. The optical computer according to claim 1, wherein the input signal from the input layer to the reservoir layer is a signal obtained by applying a weight to the input signal for the computer for each of the plurality of DOPO pulses.

5. The optical computer according to claim 1, wherein amplitudes of pulses of the pump light are independently determined.

6. The optical computer according to claim 1, wherein, assuming that a cos component and a sin component of an electric field amplitude of an i-th DOPO pulse of the DOPO at an n-th cycle in a resonator are $c_j^n$ and $s_i^n$ respectively, $c_j^n$ and $s_i^n$ are determined by following equations:

$$c_i^n = \sqrt{\eta}\, c'^{n-1}_i + r\left(m_{in}^i I_{in}^n + \sum_j J_{ij} c'^{n-1}_j\right)$$

$$s_i^n = \sqrt{\eta}\, s'^{n-1}_i$$

wherein $c'^{n-1}_i$ and $s'^{n-1}_i$ indicate a cos component and a sin component of an electric field amplitude of the i-th DOPO pulse at an (n−1)-th cycle when being output from the PSA, $l_{in}^n$ indicates the input signal corresponding to the i-th DOPO pulse at the n-th cycle, $m_{in}^i$ indicates the weight corresponding to the input signal $l_{in}^n$, $J_{ij}$ indicates a matrix representing the connection relation between the i-th DOPO pulse and a j-th DOPO pulse, and $\eta$ indicates a transmissivity of a DOPO optical system.

7. The optical computer according to claim 1, wherein, assuming that a cos component of an electric field amplitude of the i-th DOPO pulse at the n-th cycle when being output from the PSA is $c'^n_i$, an output $l_{out}^n$ from the output layer at the n-th cycle is represented by following equation:

$$I_{out}^n = \sum_i m_{out}^i c'^n_i$$

wherein $m_{out}^i$ indicates a weight of the output signal corresponding to the i-th DOPO pulse.

* * * * *